Patented July 25, 1950

2,516,109

UNITED STATES PATENT OFFICE 2,516,109

METHOD OF EXTRACTING LITHIUM VALUES FROM SPODUMENE ORES

Reuben B. Ellestad and Karl Milne Leute, Minneapolis, Minn., assignors to Metalloy Corporation, Minneapolis, Minn., a corporation of Minnesota No Drawing. Application September 16, 1948, Serial No. 49,647

4 Claims. (Cl. 23—121)

Our invention relates to the extraction of lithium from spodumene. It relates more in particular to a process in which lithium is extracted from the spodumene mineral without decomposition or dissolution of the same, and can be employed advantageously to extract lithium from relatively low grade spodumene ores. The present application is a continuation in part of our prior co-pending application, Serial No. 514,972, filed December 20, 1943, now abandoned.

While there are in excess of 100 different varieties and sub-varieties of lithium minerals and ores, the best known are lepidolite, amblygonite, and spodumene; and most of the laboratory and commercial extractions have used one or the other of these substances. All of these minerals are different in their physical and chemical make-up and behavior, and processes which may be used on one type of mineral are sometimes entirely ineffective on another type of mineral.

One of the processes used in early work for the recovery of lithium values comprised decomposition of the ore and dissolving all of the metallic constituents thereof in an acid like sulfuric acid. Such a process has been carried out successfully on lepidolite and amblygonite ores, relatively rich in lithium; but, even in the case of these ores, the required extensive purification makes the decomposition process costly and prohibitive. It has never been possible to employ the decomposition process on spodumene and we have found no conditions of acid concentration, time, or temperature, which could be employed successfully to extract lithium from the spodumene mineral by acid decomposition extraction procedures.

Large scale production of lithium, in the form of the metal or in the form of its compounds, requires the use, as a source of lithium, of spodumene ores which are much more abundant, particularly in the northern part of the United States, than are other lithium-bearing ores. While the pure spodumene mineral will contain between 6 and 8 per cent of lithium oxide ($Li_2O$), the ore as mined will not run more than about 1 to 2 per cent lithium oxide. As a consequence, even if the known decomposition procedures could be employed on spodumene, it would be economically impracticable to handle the larger volume of ore and chemicals which the use of such a process would entail. Even some of the base exchange reactions which have been used on other lithium ores and which, with some modifications, might be employed on spodumene, are not economically feasible because of the relatively large proportion of reagents required and for other reasons which those skilled in the art understand.

We have discovered an entirely new method of recovering lithium from spodumene ore, which method functions to leave the structure of the spodumene mineral intact without breaking it up, decomposing it, or dissolving it in any way, by directly substituting for the lithium ion in the mineral a hydrogen ion made available under critical conditions of time, temperature, and the like, as will be described hereinbelow. By this process we have found it possible to treat even relatively very low grade spodumene ores to recover at least of the order of 85 to 90 per cent of the available lithium without extracting from the mineral the aluminum which is present therein and forms a part of the mineral structure. Small amounts of sodium and potassium which apparently replace some of the lithium in the spodumene structure are also extracted as sulfates. Leaving the aluminum of the mineral undissolved is a function of the process itself, and does not result from the use of a separate insolubilizing procedure as is the case with some other processes.

In carrying out our process, the spodumene is preliminarily crushed and heated under suitable conditions, as will be described hereinbelow, to convert the natural occurring alpha-spodumene into beta-spodumene. The beta-spodumene is then thoroughly mixed with strong sulfuric acid in a proportion somewhat in excess of that required to satisfy the lithium ions in the mineral and within critical temperature limits which will be pointed out, with the result that the hydrogen ions of the sulfuric acid replace the lithium ions of the spodumene and the lithium ions combine with the sulfate ion to form lithium sulfate. The acid-roasted ore is leached with aqueous liquid to extract the lithium sulfate, leaving behind the spodumene mineral in its original form, except for the substitution of hydrogen for lithium, and without decomposing the mineral or dissolving the aluminum content thereof. The leach solution of lithium sulfate is then treated in any suitable manner to produce a product comprising dry lithium sulfate, or to convert the lithium sulfate to other chemical forms in which it may be used commercially.

In the first step of the process, the ore which is mined as alpha-spodumene and which may contain as low as 1 per cent and up to 6 or 8 per cent $Li_2O$, depending upon the source of the ore and whether or not it has been concentrated in any way, is heated between about 1000° C. and 1350° C. to convert the alpha-spodumene into beta-spodumene. Roasting is carried out in any suitable equipment, such as a muffle furnace, rotary furnace, direct-fired furnace, or the like, and by either a batch or continuous procedure, so long as substantially uniform and adequate temperature control are possible. The ore should not be too fine or stack losses will be prohibitive, and the pieces should not be too large or heat penetration will be retarded. In general, we have found that a preliminary crushing with a jaw crusher, in which pieces will run an average of ¼ to 1 inch, is very suitable, although flotation concentrates may and have been successfully used on a commercial basis.

The temperature and time of heating should be so controlled that substantially all of the alpha-spodumene is converted to beta-spodumene, but not at high enough temperature to fuse the ore mass. Pure spodumene fuses at about 1413° C., but impurities present in the ore usually may reduce the fusion point markedly. In ordinary decrepitation procedures, in which ores are heated at a relatively high temperature to break them up and facilitate grinding, carrying the temperature to the fusing point of some of the constituents is frequently not deleterious; but is, in fact, an advantage, because the glass-like material can be more readily ground. We have found in our process, however, that carrying the ore to a temperature of 1050° C. to 1100° C. is ample, because we are concerned with the production of beta-spodumene, and not, primarily, in ease of grinding.

Experiment and analysis will determine in a given instance and with given equipment, the conditions of time and temperature required to convert all of the mineral to beta-spodumene. In a series of tests on a sample of kunzite (a very pure grade of spodumene) containing 7.6 per cent $Li_2O$, in which tests different conversion temperatures and times were employed, and conversion determined by subsequent extraction of lithium as the sulfate, employing the process of our invention, the following values were obtained:

| Temperature of Heating | Time of Heating | Per Cent $Li_2O$ Extracted |
|---|---|---|
| °C. | Hours | |
| 850 | ½ | 0 |
| 900 | ½ | 0 |
| 950 | ½ | 0 |
| 1,000 | ½ | 62 |
| 1,000 | 1 | 81 |
| 1,000 | 1½ | 91 |
| 1,000 | 2 | 96 |
| 1,050 | ½ | 97 |
| 1,050 | 1 | 98 |
| 1,100 | ½ | 101 |
| 1,100 | ¼ | 100 |
| 1,150 | ½ | 100 |

The last three figures can be assumed to represent conditions of complete conversion. Due to slight experimental error, however, one value for extraction was obtained which was slightly higher than the total lithium content of the ore.

In other tests on very small samples in a muffle furnace, where the temperature could be very accurately controlled, it was found that samples of spodumene maintained at 1110° C. and 1120° C. for three and five minutes, respectively, showed 100 per cent conversion to beta-spodumene. In still another test, a small sample of alpha-spodumene maintained at 1120° C. for two minutes was 100 per cent converted; and a similar sample held at 1120° C. for three hours was also 100 per cent converted and extraction was 100 per cent.

These and other data indicate that spodumene is relatively quickly and completely converted from the alpha to the beta form if an adequately high temperature is reached, but that continued heating at such temperature will not inhibit lithium extraction.

In the acid roasting procedure which follows the conversion of alpha-spodumene to beta-spodumene and cooling of the resulting beta spodumene product, it is essential that the acid be brought into contact with the beta-spodumene, and to this end, mixing and control of the proportion of acid (some excess preferably is used) are important. Assuming proper mixing of the acid and beta-spodumene, the roasting temperature may then be properly controlled to obtain substantially complete recovery of lithium as the sulfate. We have found that the preferred roasting temperature is about 250° C. but, practically, the temperature may be as low as 200° C., but should not be above about 300° C. When the roasting temperature is raised substantially above 300° C., there is a marked reduction in the proportion of lithium sulfate which may later be leached from the ore.

We have made very careful measurements to determine the temperature at which the replacement of lithium ions with hydrogen ions begins to take place. Since the action is exothermic, it is not difficult to determine the minimum temperature at which exchange of ions begins; and we have found that this temperature is about 175° C. The use of a somewhat higher temperature is preferred, however, because it affords a margin of safety as to temperature.

In one series of experiments, we treated some ore by our process through the stages of conversion to beta-spodumene, cooling, mixing with acid, and acid roasting, according to a preferred procedure. The acid-roasted ore was then separated into two parts and one part leached with water to remove lithium sulfate. The portion of the ore so roasted and leached yielded 86 per cent of its lithium based upon the original content of the ore; that is to say, figuring in all losses throughout the process, the total lithium recovery from the ore so treated was shown to be 86 per cent. The remaining part of this ore was then separated into four batches and the four batches heated for one hour at, respectively, 600° C., 500° C., 400° C., and 300° C. The acid-roasted ore which had been heated to 600° C. on leaching yielded up only 27.4 per cent of its lithium; the yield for the ore heated at 500° C. was 47.3 per cent; the ore heated at 400° C. yielded 60.5 per cent of its lithium, and the ore heated at 300° C. was substantially unaffected by the second heating step; that is to say, the extraction was about 85 per cent.

We have determined that a temperature of about 250° C. yields the best results considering time, safety, and other factors, and that only a relatively very short heating time is necessary. Since the reaction is exothermic and the temperature will be maintained for some time after it has been reached, only a short actual heating period at the roasting temperature is required.

We have found that the beta-spodumene need not be finely ground to obtain an adequate extraction, since the acid will actually be absorbed by relatively large aggregates. There is some advantage, however, in uniformity of particle size and, moreover, the proportion of acid may be somewhat decreased and the leaching with water facilitated if relatively small, but uniform particle size is maintained. For this reason, the beta-spodumene ore is preferably given a relatively inexpensive, coarse grind before it is mixed with the acid.

The proportion of sulfuric acid employed is subject to considerable variation, but it should always be calculated to be at least somewhat in excess of that required to furnish sufficient hydrogen ions to replace the lithium ions in the mineral. We prefer to employ the acid in the form of 66 Baumé sulfuric acid because this provides the best combination of low freezing point and relatively low cost. In any event, it is preferred that a strong acid be employed; otherwise, there is a heat loss before sufficient moisture is evaporated to reach the desired roasting temperature. While it is possible with very careful mixing on a laboratory basis, using highly pure spodumene minerals, to effect substantially complete extraction using stoichiometric portions of acid and lithium; in commercial practice, it is advisable to employ at least 30 per cent and up to about 140 per cent excess acid, in terms of stoichiometric equivalents, depending upon the grade of ore, to assure adequate mixing and contact of acid with mineral and to provide for some loss of acid to impurities, such as sodium or the like, which may be present. In actual practice, a very large excess of acid may be employed, and regardless of the excess, none of the aluminum of the mineral, so far as we can determine, is dissolved; indeed, such traces of aluminum as may be found in the final leach solution are related to the characteristics of the ore, rather than to the proportion of acid employed. When the ore is relatively very low grade, the proportion of acid to contained lithium in the ore, in general, is increased. In general, the excess may be 30 per cent to 140 per cent of the stoichiometric equivalent; but, in most cases, assuming that mixing is adequate, 35 per cent to 40 per cent excess acid, on the higher grade ores, is sufficient. By this we mean that the amount of sulfuric acid hydrogen ions should be calculated to be approximately 130 per cent to 240 per cent of that equivalent to the available lithium ions.

The acid-roasted ore is leached with water, or with a suitable aqueous leach solution, which may, for example, be an aqueous solution which is cycled back from a wash or other operation in a cyclic process in which the lithium values are being recovered or converted in a commercial plant.

Our process is not concerned with the particular characteristics of the leaching liquid or its subsequent treatment; and the terms "water," "leach solution," or "aqueous leach solution," may be used more or less synonymously. In the leaching operation it is, of course, obvious that the excess acid is also leached from the ore and that it is essential in most instances that this free acid be neutralized. Generally, this can be done by introducing a basic compound which will preferably react to form an insoluble sulfate so that a solution comprising substantially acid free lithium sulfate may thereby be formed. Other soluble impurities may also be present in the leach solution, including, for example, a circulating load of soluble sulfates, but the lithium values may readily be separated from such impurities. While the leach liquid may actually be passed through a body of roasted ore to thereby leach therefrom the lithium sulfate and excess acid, in actual practice the ore is introduced into a so-called Pachuca or other such tank, equipped with agitating mechanism, and the ore pulped and the solution adjusted to neutrality, so that on filtration the filtrate will actually comprise a substantially neutral solution. A neutral solution may thus be formed comprising, principally, a solution of lithium sulfate, and this may be evaporated to dryness to produce a product comprising commercial lithium sulfate. A neutral solution, on the other hand, may be purified and converted to form substantially pure lithium chloride or other soluble lithium salt which may be recovered, as such, or the lithium may be precipitated as the carbonate from which other highly pure lithium compounds may be formed. In other words, the lithium sulfate when produced by our process can readily be recovered, and/or the resulting leach solution treated in accordance with any of the usual chemical processes to produce lithium in other desired forms.

The chemical mechanism and steps of our process are entirely novel so far as we know, the lithium being extracted from the mineral of the ore without decomposing the mineral or changing its structure. In the extraction of lithium from lithium-bearing ores by means of sulfuric acid, as heretofore practiced, the temperature, time, and conditions of treatment with sulfuric acid have been such that the mineral was entirely decomposed; and in those instances in which the proportion of lithium in the mineral was relatively low, it was either necessary to treat the ore in some special way after the acid decomposition to insolubilize certain other normally soluble constituents, or to treat the resulting solution extensively to purify the same. It was because of limitations in acid decomposition procedures that other methods, including those involving base exchange were employed. Our process neither involves base exchange, nor acid decomposition, and we have found no conditions under which it is possible to treat alpha-spodumene to obtain extraction in accordance with our acid roasting procedure. Both alpha-spodumene and beta-spodumene, on the other hand, may be treated by base exchange methods to recover the lithium values therefrom; but, in general, base exchange methods are entirely unsatisfactory and economically impossible when the lithium content of the ore is relatively low.

In accordance with our process, when the alpha-spodumene is first converted to beta-spodumene and then heated with sulfuric acid under the conditions described, the mineral

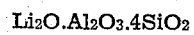

$Li_2O.Al_2O_3.4SiO_2$ is converted to $H_2O.Al_2O_3.4SiO_2$, but the water is combined in the mineral in the same manner as was the $Li_2O$ component. The mineral is otherwise unchanged and remains insoluble in water solutions. We have heated the resulting mineral aggregate, that is to say, the lithium free residue of the mineral after extraction with water, to a sufficiently high temperature to drive off all water for purposes of analysis. Tests have shown that water, so determined, corresponds to the formula given; and, when the water was so driven off, the mineral structure was completely altered, the residue apparently comprising merely a mixture of $SiO_2$ and $Al_2O_3$. We have also made X-ray spectographic analyses of the untreated beta-spodumene mineral and the residue after all of the lithium has been extracted therefrom. The spectographic analyses completely confirm the hypotheses formed as a result of chemical analyses. The mineral $Li_2O.Al_2O_3.4SiO_2$ shows a distinct X-ray spectographic pattern, and the lithium free residue, comprising by hypotheses $$H_2O.Al_2O_3.4SiO_2$$

shows substantially an identical pattern; and it is very difficult to determine whether or not there is evidence of a substitution of hydrogen ions for lithium ions. In other words, there is no greater difference between the X-ray spectographs formed by exposing, respectively, the beta-spodumene mineral and the lithium free residue, than by exposing successive samples of either. Worded otherwise, the similarity is so great (thereby showing clearly that the mineral is still completely intact and unchanged structurally) that experts has found it difficult to determine whether the spectograph was one of beta-spodumene or of the lithium free residue formed by means of our process, and chemical analysis has been found necessary for confirmation. This latter work has been done as part of a theoretical study of the mechanism of the reaction and to explain its novelty and unusual character. It is believed that the details of our process and the manner in which it may be practiced are clear from the above description. As a further disclosure to those skilled in the art, however, we give below certain specific examples, all of which are illustrative of actual procedures employing different starting materials.

*Example I*

A specimen of spodumene ore from the Black Hills of South Dakota was hand picked to produce a product containing 6 per cent by weight of lithium oxide. This ore was preliminarily crushed and charged into a rotary oil-fired kiln and heated to a temperature of 1050° C. for one-half hour. The ore was then discharged and allowed to cool and examination showed that the alpha-spodumene was substantially completely converted to beta-spodumene. Ten tons of the beta-spodumene so produced was intimately mixed with 7000 pounds of 66 Baumé sulfuric acid and the mixture so produced was roasted at 250° C. for one hour to be sure that all of the batch reached a sufficiently high temperature to form lithium sulfate. About 4000 pounds of lithium sulfate thereby became available for extraction. The acid-roasted ore was then charged into a digest tank and pulped with sufficient water to form a lithium sulfate solution containing 125 grams per liter of lithium sulfate. Using wash water from filters, in accordance with a practice common in hydrometallurgical industries, about one gallon of water was charged into the digest tank for every calculated pound of lithium sulfate in the ore. The resulting pulp of acid-roasted ore and water was neutralized with lime while being agitated to form a solution having a pH of about 8 to 10. The pulp was then filtered on an Oliver filter and the resulting lithium sulfate solution purified and water removed by evaporation to produce anhydrous lithium sulfate. Alternatively, the lithium sulfate solution was purified and reacted with sodium carbonate, and a relatively pure lithium carbonate was precipitated.

*Example II*

Ore from the Black Hills district of South Dakota, averaging about 5 per cent lithium oxide, was passed through a jaw crusher to form an average particle size of about one inch, and the crushed ore continuously charged into a rotary kiln, 40 feet long by 4 feet inside diameter, rotating at .8 R. P. M. The tilt of the kiln and rate of feed were so maintained that the ore was discharged from the kiln at the rate of one ton per hour. The kiln was fired with an oil burner, introducing sufficient heat that the ore was raised to about 1100° C. On cooling the ore, so roasted, was found to be substantially completely converted from alpha- to beta-spodumene. The resulting beta-spodumene ore was then passed through a roller mill to give it a rough grind and delivered by screw conveyor to a second rotary kiln. As the ore was passed along the screw conveyor, about 20 feet of its length was sprayed with 66 Baumé sulfuric acid, the spray being so controlled that for every ton of ore 480 pounds of acid was employed. The screw conveyor thoroughly mixed the ore and acid and the resulting mixture was continuously fed to the rotary kiln which measured 20 feet long by 30 inches inside diameter. This kiln was rotated at 4 R. P. M. and tilted to pass one and one-half tons of ore-sulfuric acid mixture per hour. The kiln was continuously fired with an oil flame, controlled to discharge the material at 250° C.

After leaving the acid roaster, the acid-roasted ore was charged into a pulp tank where it was pulped with an aqueous liquid to leach out lithium sulfate. The pulped ore was then treated with lime to raise the pH to between 6 and 7 and the entire mass was then filtered to separate the resulting solution from the ore residue and from the calcium sulfate formed in the neutralizing procedure. The leach liquor was then treated to recover the lithium values therefrom, by first precipitating by known methods such small amounts of calcium, magnesium, and aluminum as were found to be present and finally precipitating lithium carbonate by the addition of sodium carbonate. Analysis showed that 90 per cent of the total lithium content of the ore was recovered and this took into consideration all losses, including stack and other losses during the first roasting step, losses in the leach tank, losses on the filter, etc.

*Example III*

The acid-roasted ore from Example II was leached with fresh well water by a pulp procedure and the excess acid neutralized with calcium carbonate, the product filtered, the filtrate treated with sodium carbonate to precipitate calcium carbonate, and the pH of the filtrate adjusted to neutrality and dried. The dried product contained 86 per cent lithium sulfate, 13 per cent sodium sulfate, and 1 per cent potassium sulfate.

In a modification of the above procedure, the liquor leached from the acid-roasted ore was neutralized with calcium carbonate, the soluble calcium sulfate removed from solution by the introduction of lithium carbonate (which thereby precipitated calcium as the carbonate) and the resulting solution evaporated to dryness. The dried product analyzed 93 per cent lithium sulfate, 6 per cent sodium sulfate, and 1 per cent potassium sulfate.

*Example IV*

Regular mine run of ore from the Black Hills of South Dakota, averaging 1.8 per cent lithium oxide, was treated as in Example II, except for the modifications in procedure described below:

The ore was preliminarily crushed to a somewhat smaller size than in the case of the higher grade ore, namely to an average size of ¼ to ½ inch. The beta-spodumene ore from the preliminary roasting procedure was fed to the acid roaster after a thorough mixing with 300 pounds of 66 Baumé acid per ton of ore. This represented 138 per cent excess of acid, employed to assure adequate mixing of the acid and lithium-bearing portion of the ore. The use of the lower grade ore results in some loss of acid because of the greater excess required, but an advantage is gained in the use of the lower grade ore, and so far as we know, no other method available can be used to treat ore of this character. The acid roasted ore was pulped in a Pachuca as in the previous example, but the leach liquor was recirculated to several batches of ore to build up the lithium content of the circulating solutions. More limestone also was required to neutralize the excess acid, but the chemical operations are substantially the same as in the case of the high-grade ore and lithium values were recovered from the leach solutions by suitable procedure, as in the previous examples. Analysis showed that about 85 per cent of the lithium content of the ore was recovered.

Example V

A flotation concentrate of alpha-spodumene from King's Mountain, North Carolina, averaging between 6 and 6.5 per cent lithium oxide was continuously charged into a kiln as in Example II and feed adjusted to one ton per hour. The furnace was fired to raise the temperature to 1100° C. as the material was discharged. Substantially complete conversion to beta-spodumene was obtained and the beta-spodumene, after cooling, was conveyed to a second rotary kiln by means of a screw conveyor where it was mixed with a 66 Baumé sulfuric acid in the ratio of 600 pounds of acid to one ton of roasted concentrate. The acid-ore mixture was charged into a second kiln and the oil burners adjusted to discharge the material at 240° C., the kiln being continuously operated and adjusted to pass one and one-half tons per hour. The acid-roasted beta-spodumene so produced was pulped with aqueous liquid and the leach liquor treated to recover lithium values therefrom. In excess of 90 per cent of the lithium contained in the concentrate was thus recovered.

Our improved process as described hereinabove is effective, so far as we can determine, only on lithium aluminum silicate ores of the spodumene type. It is definitely not capable of successful use on lithium-bearing micas and lithium aluminum-fluophosphates, as exemplified by lepidolite and amblygonite, respectively. The claims, therefore, which define the invention are limited to the practice thereof on spodumene.

What we claim as new and desire to protect by Letters Patent of the United States is:

1. The method of extracting lithium values from spodumene ores, which comprises heating the ore above about 1000° C. but below the fusion temperature thereof to convert the alpha-spodumene of the ore to beta-spodumene, mixing the beta-spodumene ore so formed with strong sulfuric acid to produce a substantially dry mixture of ore and acid in which the acid has been absorbed by the ore, roasting the said dry mixture between a temperature of about 200° C. and substantially below 500° C., whereby to substitute hydrogen ions from the sulfuric acid for the lithium ions of the spodumene, and leaching the resulting acid roasted product with an aqueous liquid to extract lithium sulfate and leave the structure of the lithium-bearing spodumene mineral otherwise substantially unaffected.

2. The method of extracting lithium values from spodumene ores which comprises heating the ore to about 1100° C. to convert the alpha-spodumene of the ore to beta-spodumene, cooling the beta-spodumene ore, crushing the cooled ore, thoroughly mixing the same with strong sulfuric acid to produce a substantially dry mixture of ore and acid in which the acid has been absorbed by the ore, the proportion of sulfuric acid being in excess of that required to combine chemically with the lithium of the ore, roasting the said dry mixture at a temperature of about 250° C. whereby to substitute hydrogen ions for the lithium ions in the spodumene and leaching the resulting acid roasted product with an aqueous liquid to extract lithium sulfate without substantially affecting the structure of the beta-spodumene.

3. The method of extracting lithium from beta-spodumene, which comprises mixing the beta-spodumene with an excess of strong sulfuric acid over that calculated as the stoichiometric equivalent of the lithium present to produce a substantially dry mixture of ore and acid in which the acid has been absorbed by the beta-spodumene, roasting the resulting dry mixture at a temperature between 200° C. and 300° C., whereby to substitute hydrogen ions for the lithium ions of the spodumene mineral, and leaching the resulting acid roasted product with an aqueous liquid to extract lithium sulfate and leave the structure of the beta-spodumene substantially unaffected.

4. The method of extracting lithium from beta-spodumene, which comprises mixing the beta-spodumene with about 66 Bé. sulfuric acid, in proportion about 30 per cent to about 140 per cent in excess of the stoichiometric equivalent of lithium present, whereby to produce a substantially dry mixture of beta-spodumene and acid in which the acid has been absorbed by the beta-spodumene, roasting the resulting dry mixture at a temperature of about 250° C. whereby to substitute hydrogen ions for the lithium ions of the spodumene and leaching the resulting acid roasted product with an aqueous liquid to extract lithium sulfate and leave the structure of the beta-spodumene substantially unaffected.

REUBEN B. ELLESTAD.
KARL MILNE LEUTE.

REFERENCES CITED

The following references are of record in the file of this patent:

UNITED STATES PATENTS

| Number | Name | Date |
| --- | --- | --- |
| 836,781 | Poulenc | Nov. 27, 1906 |
| 847,856 | Wadman | Mar. 19, 1907 |
| 1,544,114 | Weidmann | June 30, 1925 |

OTHER REFERENCES

Mellor's "A Comprehensive Treatise on Inorganic and Theoretical Chemistry," vol. 2, 1922 ed., p. 443. Longmans, Green & Co., New York, publishers.